Feb. 12, 1952     L. W. HAMLIN     2,585,769
WINDSHIELD VISOR
Filed Sept. 22, 1948     2 SHEETS—SHEET 1
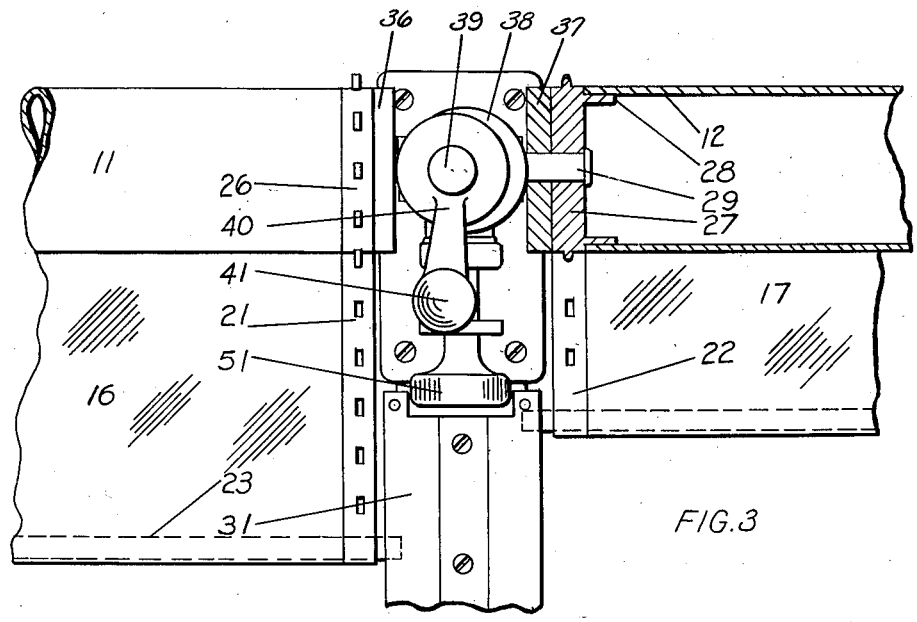
FIG. 3
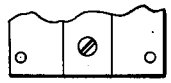
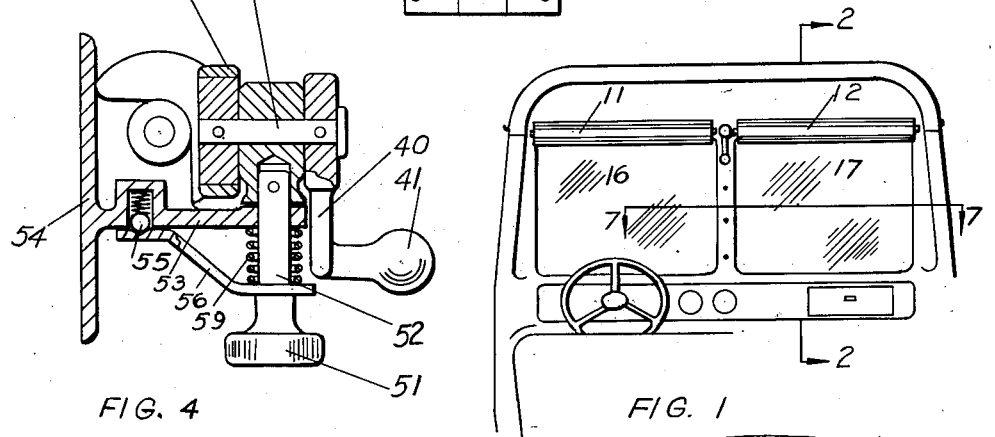
FIG. 4     FIG. 1
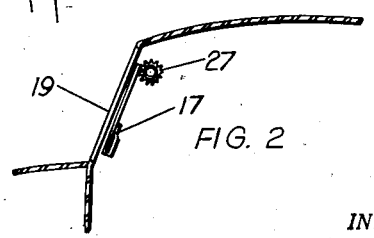
FIG. 2
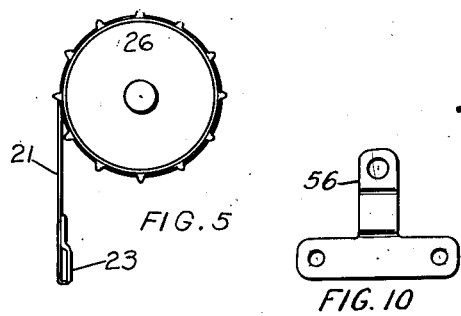
FIG. 5     FIG. 10
INVENTOR.
LEWIS W. HAMLIN
BY
Martin J. Finnegan
ATTORNEY

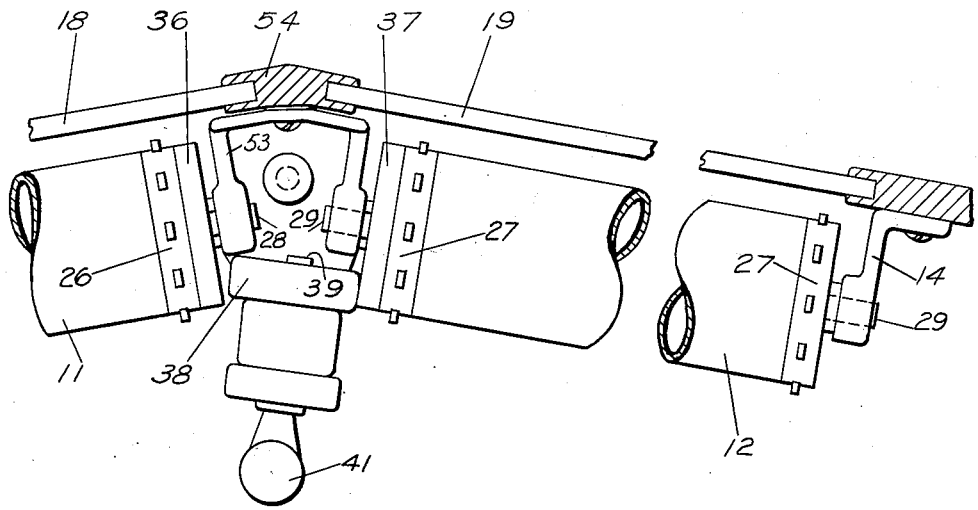
FIG. 6
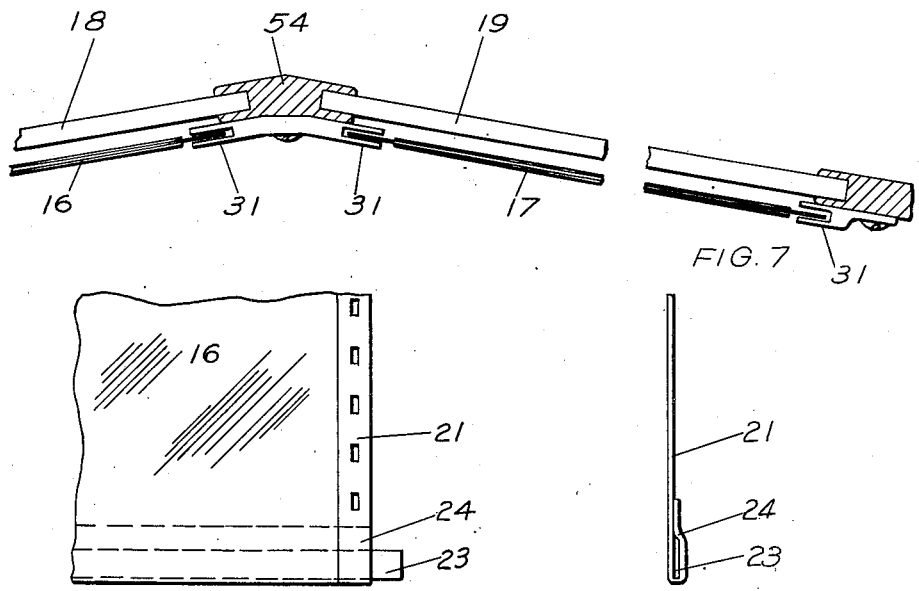
FIG. 7
FIG. 8
FIG. 9
INVENTOR.
LEWIS W. HAMLIN
BY Martin J. Finnegan
Attorney Patented Feb. 12, 1952

2,585,769

UNITED STATES PATENT OFFICE 2,585,769

WINDSHIELD VISOR

Lewis W. Hamlin, Owosso, Mich.

Application September 22, 1948, Serial No. 50,561

2 Claims. (Cl. 160—120)

This invention relates to automotive vehicles, and particularly to the application to such vehicles of means for protecting the driver's eyes from the effects of excessive or glaring light rays striking the wind-shield of such a vehicle.

Many vehicles are now equipped with visors hingedly mounted on the exterior of the vehicle and movable toward or away from the exterior surface of the wind-shield, to provide more or less of a barrier to light rays, blocking such rays before they can strike and pass through the clear glass of the wind-shield. Such devices are of value as glare reducers, but are objectionably difficult to adjust, it being necessary for the driver or other occupant of the vehicle to leave his seat, emerge from the vehicle, and frequently go through the process of manipulating several screws or other fixtures before he can properly position the hinged visor.

An object of the present invention is to provide a simpler form of glare reducing screen, positionable by a simple operation that the driver can perform without leaving his seat in the vehicle.

Another object of the invention is to provide a glare reducing screen movable adjacent the inner surface of the wind-shield, in a plane parallel thereto, and controlled by mechanism located entirely within the body of the vehicle.

Another object is to provide novel means for mounting and operating a glare reducing screen of the character indicated.

A further object is to provide a plurality of glare reducing screens, one for each section of a wind-shield, together with a single manually controllable drive therefore, permitting selective operation thereof.

These and other objects of the invention will be better understood upon reference to the accompanying drawings illustrating one application of the invention. It is to be understood, however, that these drawings, and the following description thereof, merely exemplify the invention without attempting to define its scope or limits; the scope and limits being indicated in the appended claims.

In the drawings—

Figure 1 is an elevation view of an automobile wind-shield, with the invention applied thereto; the view being from the driver's seat;

Figure 2 is a transverse sectional view along line 2—2 of Figure 1;

Figure 3 is a fragmentary view similar to Figure 1, but on a larger scale and with certain parts sectioned;

Figure 4 is a transverse sectional view through the center of Figure 3;

Figure 5 is a detail view, showing how the glare reducing screen is positively driven, in both directions, by teeth on the driving roller;

Figure 6 is a fragmentary top plan view of the two driving rollers, on the scale of Figures 3 and 4;

Figure 7 is a fragmentary horizontal sectional view through the screens and wind-shield, along line 7—7 of Figure 1;

Figure 8 is a view of one corner of one of the screens, showing the metal driving tape and metal retainer strip;

Figure 9 is an edge view of the screen elements shown in Figure 8; and

Fig. 10 is a top plan view of the member which holds the driving mcehanism in adjusted position.

A pair of reels or rollers 11, 12 are mounted in brackets 14 secured to the body of the vehicle in positions such that the glare reducing screens 16, 17 carried thereby will be drawn down across the field of vision through the two glass panels 18, 19, respectively, of the wind-shield. Each screen is of thin, flexible, translucent plastic material capable of filtering the light coming through the clear glass of the wind-shield, so that the rays actually passing to the eyes of the driver (or his companion, to his right, if the screen 17 is also drawn) will be substantially free of glare effects. Each screen carries perforated metal tapes (see tapes 21, 22, Figure 3) cemented or otherwise secured thereto, along each vertical edge, also a horizontal metal strip 23 suspended in loops 24 formed at the bottom of each tape 21 (see Figures 8 and 9). The tapes 21 register with teeth or metallic drive wheels 26, 27, the latter being metal castings, or the like, having extending rims 28 (see Figure 3) to receive and support the ends of the tubular rollers 11, 12. The wheels are centrally apertured to receive the pins 28, 29 by which they are journalled in the bracket 14.

The strip 23 at the bottom of each screen, or curtain, has its ends received in channel-shaped guides or tracks 31 (see Figure 7) secured to the body of the vehicle, so that the screen will remain in a plane parallel to the glass of the wind-shield, and closely adjacent the inner surface of such glass, as it is drawn up or down, to the desired degree, by operation of the novel manual control means, now to be described.

The manual control is shown as including a pair of friction discs 36, 37 secured to the inner faces of wheels 26, 27, respectively, and rotatable by a third friction disc 38 (Figures 3, 4 and 6) carried on a shaft 39 which also carries a crank 40 having a handle 41 easily accessible for manual rotation by the driver, or his companion, without leaving his seat in the vehicle. As shown best in Figure 6, the disc 38 is engageable with only one of the two discs 36, 37 in one position, and can be shifted manually to engage and rotate the other disc, so that there may be selective operation of either screen. For manual shifting in this manner I provide a knob 51 on a shaft 52 extending through a slot in a bracket 53 integral with the main support 54. As the friction disc 38 is shifted laterally a spring-pressed detent 55 (Figure 4) yields, and then re-engages the arm 56 in the new position, at the opposite limit of shift of the shaft. Thus the driving roller 38 is yieldably held in either driving position to which it is shifted. A second spring 59 supplements the detent spring in effecting this yieldable restraint.

If preferred, the vertical border strips 21 may be of transversely bowed strip steel, or the like, such as is used in steel, reel-wound measuring tapes. In such case the bowed strips will serve to hold the screen 16 closely parallel to the windshield glass, without the need of tracks 31 for such purpose. In such a modification, therefore, said tracks 31 could be omitted.

What I claim is:

1. Anti-glare apparatus for a two-panel windshield, said apparatus comprising a plurality of translucent screens, one for each panel of the windshield, and common driving means including a single drive gear shiftable to either of two operating positions for operating said screens selectively.

2. Anti-glare apparatus for a two panel windshield, said apparatus comprising a plurality of translucent screens, one for each panel of the windshield, a common driving means including a single drive gear shiftable to either of two operating positions for operating said screens selectively, and means for yieldably holding said drive gear in each of said operating positions.

LEWIS W. HAMLIN.

REFERENCES CITED

The following references are of record in the file of this patent:

UNITED STATES PATENTS

| Number | Name | Date |
| --- | --- | --- |
| 1,373,256 | Mugno | Mar. 29, 1921 |
| 1,513,769 | Sullivan | Nov. 4, 1924 |
| 1,525,832 | Sterling | Feb. 10, 1925 |
| 1,932,475 | Peteler | Oct. 31, 1933 |
| 1,967,868 | Converse | July 24, 1934 |
| 2,112,726 | Kemp | Mar. 29, 1938 |
| 2,363,762 | Wardan | Nov. 28, 1944 |